(12) United States Patent
Nightlinger et al.

(10) Patent No.: US 7,354,513 B2
(45) Date of Patent: Apr. 8, 2008

(54) COUNTERTOP WATER TREATMENT UNIT

(76) Inventors: Scott Nightlinger, 203 N. Eastwood Ave., Mount Prospect, IL (US) 60056-2416; Agnieszka Nightlinger, 203 N. Eastwood Ave., Mount Prospect, IL (US) 60056-2416; Piotr Loniewski, ul. Ostrobramska 80, m. 86, 04-163 Warsaw (PL); Grzegorz Loniewski, ul. Ostrobramska 80, m. 86, 04-163 Warsaw (PL)

( * ) Notice: Subject to any disclaimer, the term of this patent is extended or adjusted under 35 U.S.C. 154(b) by 0 days.

(21) Appl. No.: 10/445,784

(22) Filed: May 27, 2003

(65) Prior Publication Data

US 2003/0222008 A1    Dec. 4, 2003

Related U.S. Application Data

(60) Provisional application No. 60/383,571, filed on May 28, 2002.

(51) Int. Cl.
*B01D 27/00* (2006.01)
(52) U.S. Cl. .............. 210/232; 210/282; 210/287; 210/419; 210/429; 210/451
(58) Field of Classification Search .......... 210/232, 210/282, 287, 419, 429, 437, 451, 456
See application file for complete search history.

(56) References Cited

U.S. PATENT DOCUMENTS

| 3,184,064 | A | * | 5/1965 | Sampson et al. | 210/136 |
| 3,342,340 | A | * | 9/1967 | Shindell | 210/282 |
| 4,603,001 | A | * | 7/1986 | Ward | 210/791 |
| 5,277,805 | A | | 1/1994 | Ferguson | 210/266 |
| 5,685,981 | A | | 11/1997 | Koslow | 210/282 |
| 6,120,691 | A | | 9/2000 | Mancil | 210/748 |
| 6,203,697 | B1 | | 3/2001 | Ferguson | 210/232 |
| 2003/0222008 | A1 | * | 12/2003 | Nightlinger et al. | 210/282 |

* cited by examiner

*Primary Examiner*—Robert James Popovics
(74) *Attorney, Agent, or Firm*—Charles F. Lind

(57) ABSTRACT

An improved residential countertop water treatment unit for producing potable water suitable for human ingestion such as by drinking or cooking that comprises a vertical arrangement of a base, a cartridge, and a spigot at the top. The base includes an elongated threaded stub pipe extended downward for fastening the base to a sink surface or countertop and for receiving water from a potable cold water supply line. The base includes an internal valve for controlling water flow between the elongated threaded stub pipe and the inlet of the water filter cartridge. With the valve closed, the cartridge may be readily exchanged by simply unscrewing the spent cartridge from the base and then screwing in a new cartridge.

10 Claims, 3 Drawing Sheets

COUNTERTOP WATER TREATMENT UNIT

This application claims priority to provisional application 60/383,571 filed May 28, 2002.

BACKGROUND OF THE INVENTION

This invention relates to a water treatment apparatus. More particularly, it relates to a water treatment unit for use as a residential countertop filter for producing potable water suitable for human ingestion such as by drinking or cooking, having a solid base easily and firmly secured to the sink countertop surface and a water treatment cartridge that is easily replaced and discarded at the end of its useful life.

A wide variety of water treatment devices are known in the prior art and most have filtration unit cartridges that are difficult and messy to replace, where water is readily spilled. Typically employed countertop residential or office water filters consist of a vertically oriented cylinder that receives water from a diverter valve attached to a sink faucet and introduces tap water to the filter and dispenses the treated water from a spigot. The tubing interconnecting the diverter valve and the filtration unit is typically obtrusive and inconvenient for those people working near the sink.

Moreover, the configuration is bulky and requires that the filter units be inconveniently located adjacent to the sink where they interfere with routine tasks such as washing dishes or food preparation. Since water often collects on the countertop and behind the faucet during normal use of the sink, countertop water filters such as that shown in U.S. Pat. No. 5,277,805 make it difficult to clean up this collected water and subsequently allow the growth of mold and bacteria on the sink surface.

In another example, the water filter known from U.S. Pat. No. 5,685,981 consists of two parts: a base and a cartridge. The cartridge contains multiple water channels directing water to the water treatment material, and is screwed into a socket in the base. The cartridge is exchanged by unscrewing the old cartridge from the base and then screwing the new cartridge into the base. The construction of this cartridge and base is complicated, comprises inconvenient tubing, and is expensive to produce.

An additional disadvantage to the countertop water filters known in prior art is that the required water supply connection at the end of the sink faucet is not possible with modern faucet designs.

BRIEF SUMMARY OF THE INVENTION

Accordingly, it is a primary objective of the present invention to provide a long lasting water treatment unit with a simple and inexpensive construction that corrects the listed disadvantages.

The present invention provides a countertop water treatment unit comprising a vertically oriented, elongated water treatment cartridge and a base. The base receives the cartridge, within which is enclosed a water treatment material. The base includes an elongated threaded stub pipe that extends downward from underneath the base. The external construction of the stub pipe fastens the base to the sink surface or any other countertop, and it receives potable water from an undersink cold water supply line. The base includes water passages in a fluid flow connection with the inlet of the water treatment cartridge. The base further includes a valve controlling the water flow through the water treatment cartridge. The top end of the elongated water treatment cartridge comprises a port with a socket for a means of dispensing the treated water. The cartridge may have various forms adopted for use in several configurations. The valve may have a different construction and location. The base may take on different embodiments.

The present invention provides a water treatment unit with several unique advantages and superior features.

The present invention provides a solid structure firmly secured to the sink surface or countertop preventing it from being knocked down or misplaced.

The separate construction of the water treatment unit from the sink faucet allows it to be installed on a sink independently of the type of faucet because many modern faucets do not allow for on-faucet filter installations.

The present invention allows for full sink functionality and usage even during the water treatment operation.

The present invention is easy and inexpensive to produce because it constitutes an integral construction and it avoids unnecessary parts such as external tubing or on-faucet installation kits that often interfere with kitchen activities.

The construction of the present invention prevents water spillage during replacement of the treatment cartridge.

The present invention avoids leaks and inconvenient undersink cartridge replacement.

The construction allows the treatment cartridges to be easily replaced by anyone without any tools.

Additional objects, features, and advantages will become apparent from the following description and appended claims.

DETAILED DESCRIPTION OF THE INVENTION

Figure 1:
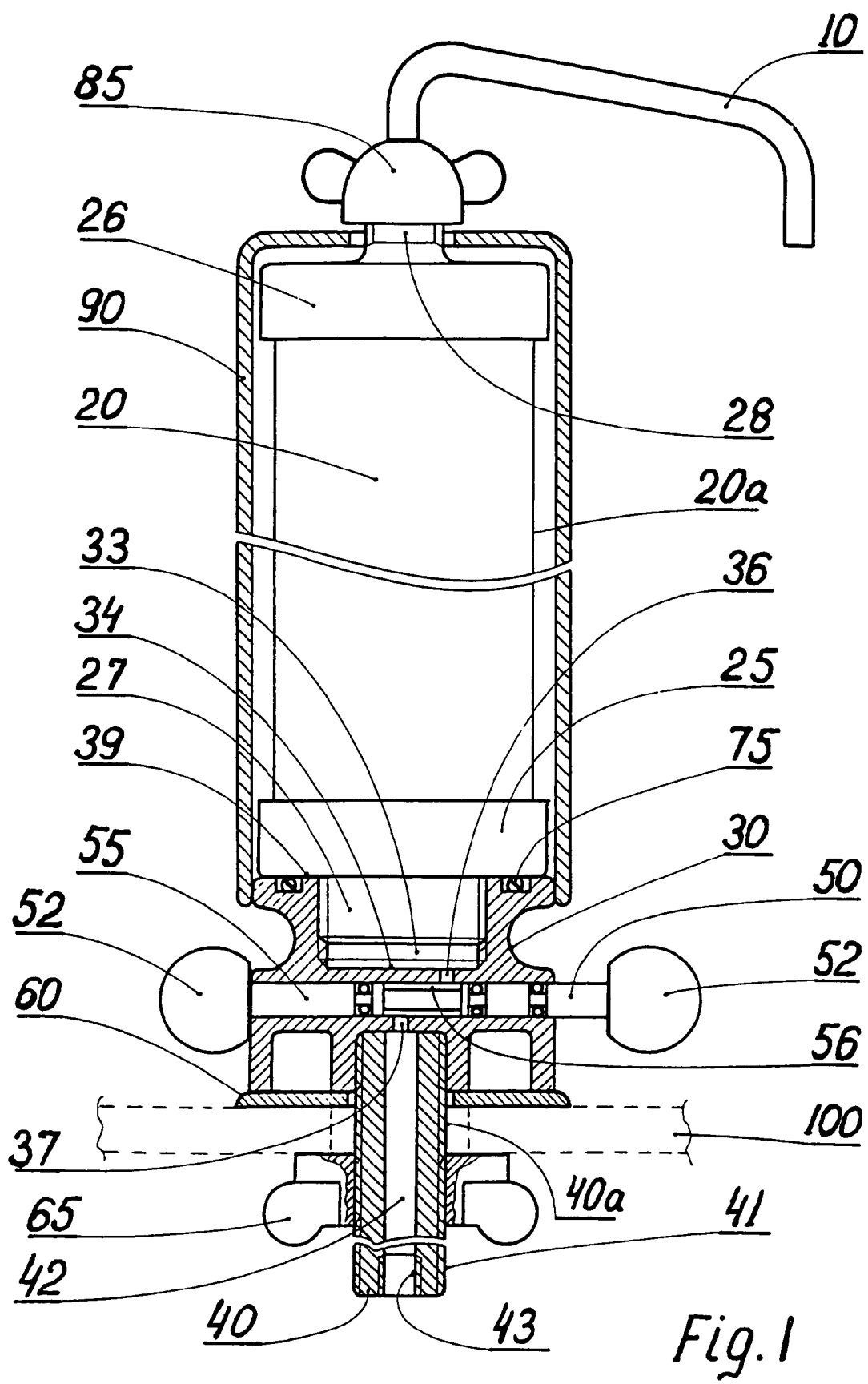
FIG. 1 is a partial cross-sectional view taken along the longitudinal axis of the water treatment unit mainly illustrating the base portion of the unit in accordance with the invention.
Figure 2:
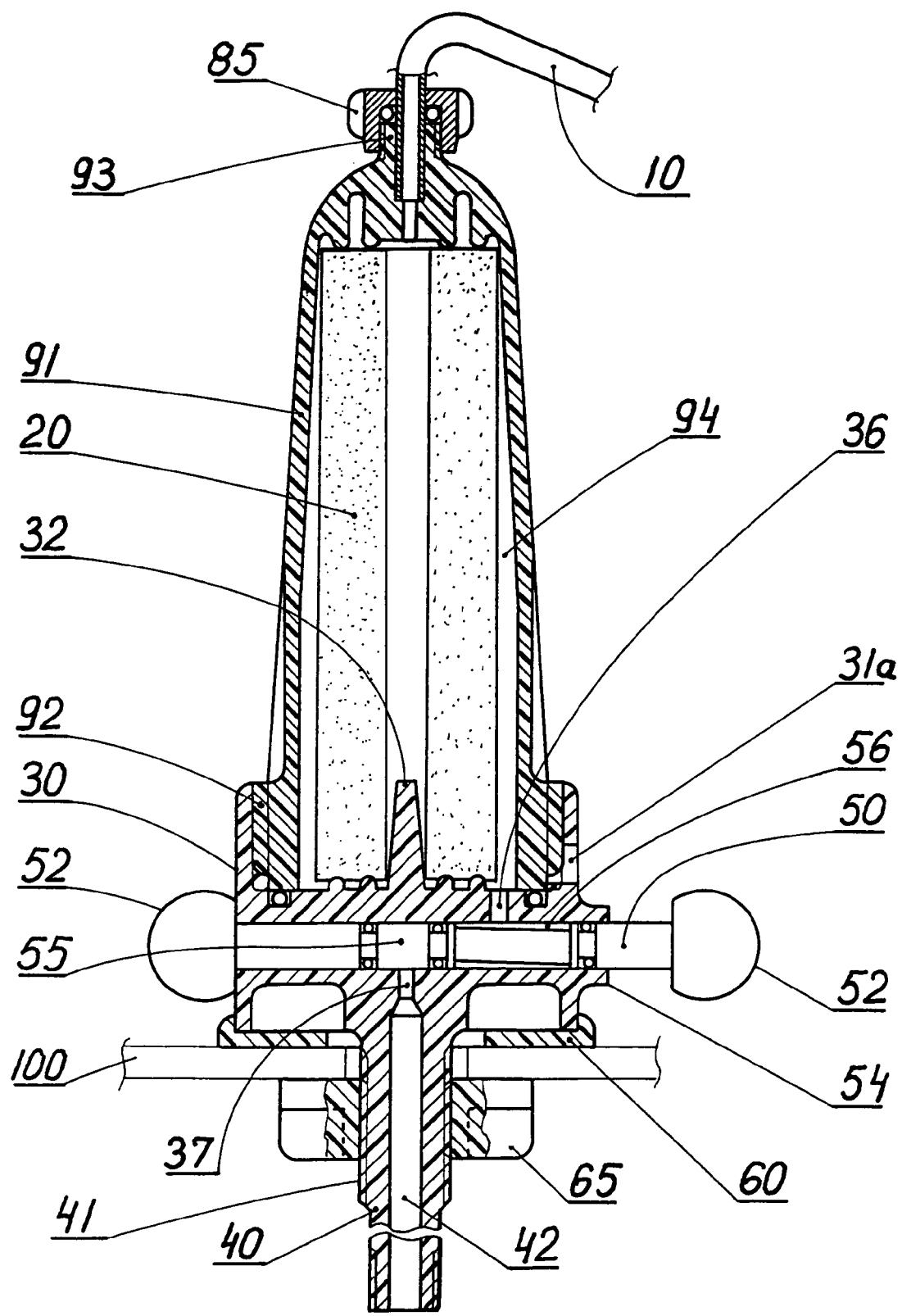
FIG. 2 is a full cross-sectional view taken along the longitudinal axis of the water treatment unit illustrating the base and cartridge of the unit in another configuration in accordance with the invention.
Figure 3:
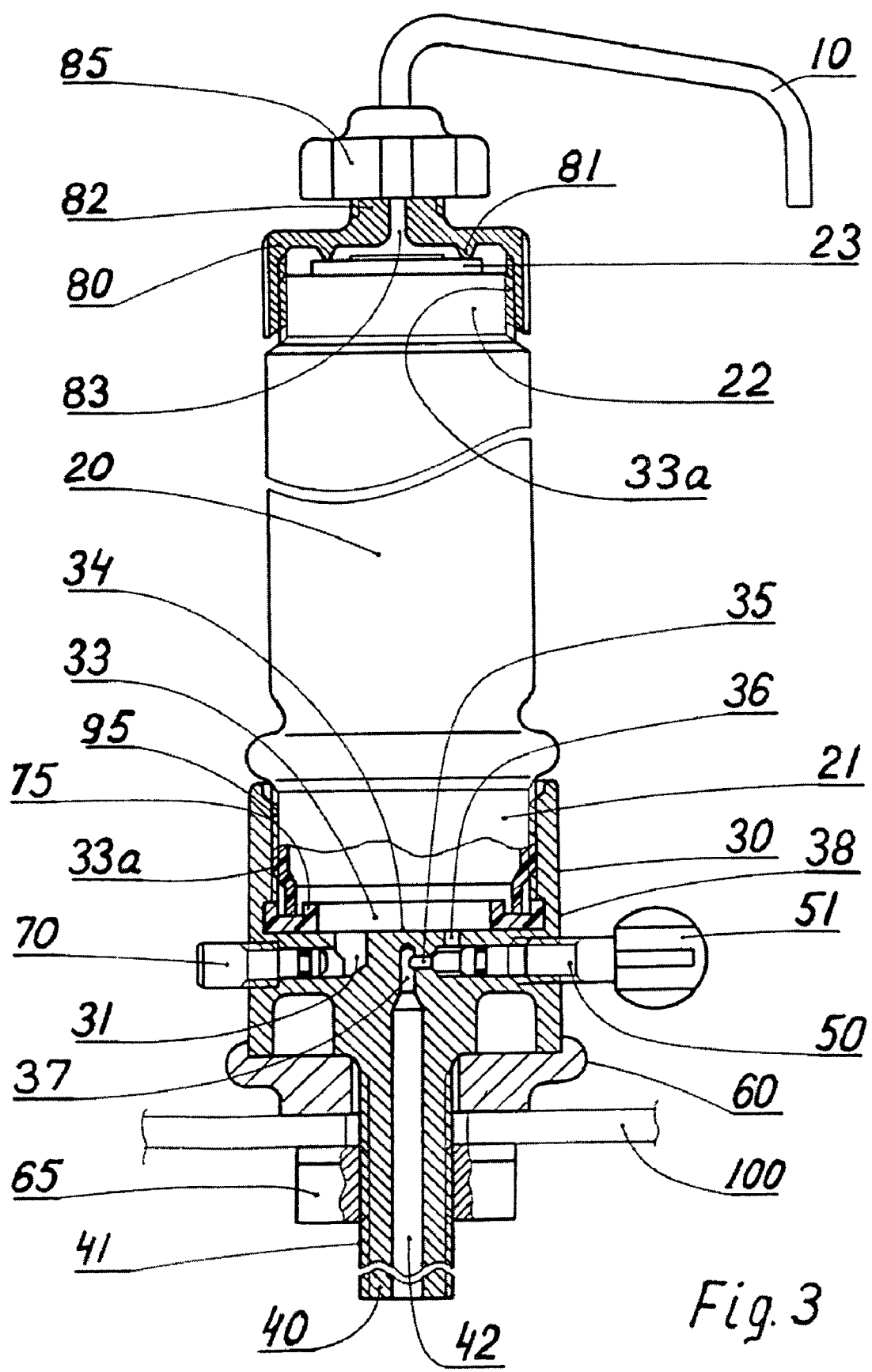
FIG. 3 is a partial cross-sectional view taken along the longitudinal axis of the water treatment unit similar to FIG. 1, illustrating the base and cartridge of the unit in still another configuration in accordance with the invention.

The inventive countertop water treatment unit is illustrated in its fully assembled condition in FIG. 1, FIG. 2, and FIG. 3, consisting of three different configurations.

Two embodiments of the water treatment units are shown in FIG. 1 and FIG. 3. The embodiments are similar to each other whereby it will also be apparent that a number of variations and modifications may be made therein by those skilled in the art without departing from the spirit and scope of the invention. Accordingly, the foregoing description is to be construed as illustrative rather than limiting. In general, both water treatment units shown in FIG. 1 and FIG. 3 comprise a vertically oriented, elongated water treatment cartridge 20 having a plastic shell filled with activated carbon insertable in socket 33 of a base 30. Each base includes a combined means 40 extended downward from its intermediate surface. The combined means 40 is provided for receiving water from a potable cold water supply line and for fastening each base to a sink surface 100 or the like. Each base includes a valve 50 for controlling water flow through the water treatment cartridge 20.

The base shown in FIG. 1 is made of externally chromed brass. The combined means 40 constitutes a brass pipe 40*a*. The brass pipe 40*a* comprises fastening threads 41 and is inserted and welded into the base 30. The corresponding brass nut 65 and plastic sealing ring 60 are provided on the brass pipe 40*a* for fastening the base 30 to a sink surface 100. The brass pipe 40*a* extends downward from the base 30 and includes an internally threaded inlet port 43 for receiving water from a water supply conduit (not shown) through a small diameter, commercially available, poly flex connector. The valve 50 inserted in the base 30 is a slide valve located between the water inlet passage 37 and water outlet passage 36. The stem 55 of the slide valve 50 comprises an asymmetrical opening 56 for regulating water flow through the water treatment cartridge 20. From the top, the base 30 comprises a threaded cylindrical female opening 33 for receiving the inlet end of the water treatment cartridge 20.

The cartridge 20 shown in FIG. 1 has a housing made of a suitable plastic cylinder 20*a* closed on the ends with caps 25 and 26. The bottom end cap 25 comprises a short threaded inlet stub pipe 27, which is inserted into the female threaded opening 33 of the base 30. The cartridge 20 further comprises a smaller outlet stub pipe 28 extending from the top cap 26. In addition, the unit comprises a decorative chromed cover 90 that covers the water cartridge 20. On the top end of the cartridge, a spigot 10 and its fitting 85 are further installed on the stub pipe 28. The unit, preferably mounted on the sink surface 100, is secured to the sink by a nut 65. Potable water from the cold water supply line enters the threaded brass pipe 40*a* through a poly flex connector (not shown) and through the brass pipe's opening 42. Next, the water flows through the base inlet passage 37, the valve's opening 56, and the base outlet passage 36 into the base's threaded opening 33. Because the water treatment cartridge stub pipe 27 is threaded into the threaded opening 33 in the base 30 and sealed with ring 75 on the contact surface 39, water is forced to flow longitudinally through the cartridge 20, where it enters the cartridge outlet stub pipe 28, then through the fitting 85 to flow out through the spigot 10. The cartridge 20 is easily exchangeable by simply unscrewing the spigot with its fitting 85, removing the decorative cover 90, and unscrewing the cartridge 20 from the base 30 and screwing in a new one.

The base 30 shown in FIG. 3 having a combined means 40 and valve 50 constitutes a monolithic piece made of externally chromed and polished brass. The monolithic piece can be made of another suitable material such as plastic. The valve 50 is a needle valve and allows regulation of water flow through the base 30 via water inlet passages 42, 37 and 35, to outlet passage 36 by operating the knob 51. By spinning the knob 51 to the stop point, the valve will stop the water flow through the base and to the cartridge 20. The socket 33, for receiving the end 21 of the water treatment cartridge 20, comprises a drainage opening 31, plugged with a screw plug 70. To prevent leakage, a silicone ring 75 lying on the surface 34 in the socket 33 is provided. Also, the plastic sealing ring 60 and nut 65 is provided for fastening the unit to a sink surface 100 or the like. In this configuration, cold water from the undersink water supply line through a commercially available poly flex connector (not shown) enters the unit through the inlet passage 37.

The water treatment cartridge 20 shown in FIG. 3 is substantially in the form of a cylinder and comprises fastening threads 33*a* on the inlet end 21 and on the outlet end 22. The threaded top end 22 of the cartridge 20 comprises a washer 23 to prevent water leakage and possesses an internally threaded cap 80 with its sealing flange 81. The cap 80 is ended with a stub pipe 82 possessing a water flow passage 83. On the stub pipe 82, there is a spigot 10 screwed with a nut 85. When the valve 50 opens, water enters through the opening 42, passage 37, the valve's channel 35, and flows through the passage 36 into the inlet end of the cartridge 20. Further, the water is then forced surface of the cartridge 20 thereby preventing leakage. Water passing through the cartridge 20 enters the passage way 83 in the cap 80 and flows out through the fitting 85 and the spigot 10. When the cartridge is being replaced, the end cap 80 is unscrewed and saved for reinstallation. The old cartridge 20 is unscrewed from its socket 33 in the base 30 and the new cartridge 20 is screwed in. The saved end cap 80 with its spigot 10 and fitting 85 is screwed back on the top end 22 of the new cartridge 20. The ability to unscrew the plug 70 and drain the water treatment unit provides a means to prevent spillage, check the condition of the sealing ring 75, and clean out the socket 33 if needed.

Another embodiment of the water treatment unit is illustrated in FIG. 2. The unit comprises a vertically oriented hollow cylindrical water treatment cartridge 20, a filtrated water outlet means 10, a base 30 having an interior for receiving an end of the hollow cylindrical water treatment cartridge 20, and a removable housing 91 with one open end enclosing the water treatment cartridge 20 on the base 30. The base 30, having a cylindrical exterior, includes a combined means 40 extended downward from its intermediate surface. The combined means 40 is provided for fastening the base 30 to a sink surface 100 or the like and for receiving water from a potable cold water supply line. The base includes a valve 50 for controlling water flow through the water treatment cartridge 20. The base 30 and the cup shaped housing 91 are preferably made of a plastic such as polypropylene and may be of other suitable materials. The base 30 having a raised boss 54 on one side, comprises a central protrusion 32 for receiving the end of a water treatment cartridge 20. The combined means 40 is for fastening the base 30 to a sink surface 100 and for receiving water from an undersink water supply line (not shown). The combined means 40 and the base 30 constitute a monolithic and integral structure. The combined means 40 is in the form of a stub pipe and comprises fastening threads 41 and a corresponding nut 65. The base 30 includes a water flow inlet passage 37 and outlet passage 36. Between the inlet 37 and outlet 36 water flow passages is an internal slide valve 50, which is positioned for stopping water flow when treated water is not dispensed. The slide valve 50 comprises a cylindrical but not axially symmetrical opening 56 on its slide rod 55. When the handle button 52 is pushed to the boss 54, water flows between the inlet 37 and outlet 36 passages through the opening 56 in the valve slide rod 55. The valve slide rod 55 comprises o-ring seals, preventing water leakage. Water flow intensity may be regulated by spinning the knob 52 of the valve 50. The unit includes a commercially available hollow cylindrical water treatment cartridge 20 enclosing a water treatment material such as porous activated carbon. The cup shaped housing 91 encloses the hollow cylindrical elongated cartridge 20 inserted in the base member 30. The base 30 and the housing 91 comprise corresponding fastening threads 92 for retaining the housing 91 in the base 30. The housing 91 on its top closed end comprises a small threaded stub pipe 93 and fitting 85 for retaining a spigot 10. A plastic sealing ring 60 and brass nut 65 are provided to enable the base 30 to securely sit upon a sink surface 100 or countertop. In this configuration the longitudinally hollow cylindrical cartridge 20 is installed within the housing 91 and is secured in the base 30. The central protrusion 32 in the base 30 serves to maintain the cartridge 20 in its correct position within the housing 91. The open end of the housing 91 is slightly flared and externally threaded. The open end of the housing 91 is threaded into the base's threaded opening and sealed by the ring 75 sitting in the base groove. Both ends of the cartridge 20 are pressed by sealing flanges of the base 30 and of the housing 91 when the housing 91 is threaded into the base 30. Water flow at the ends is then blocked. The water enters into the space 94 in the same manner as described in FIG. 1. Water in the space 94 surrounds the hollow cylindrical cartridge 20 and because the flow on the ends is blocked, water is forced to flow radially through the porous filter cartridge and up its central passage where it enters the passageway in the stud pipe 93 on the top of the housing 91. Filtrated water is dispensed from a spigot 10 attached to the stub pipe 93 with its fitting 85 screwed on the threaded stub pipe 93. The hollow cylindrical cartridge 20 may be readily exchanged by simply unscrewing the housing 91 from the base 30, taking out the old cartridge, inserting a new one and screwing back the housing 91 into the base 30. During the exchange process, the drainage opening 31a provides a means for the water to drain from the water treatment unit to prevent spillage, check the condition of the sealing ring 75, and clean out the socket if needed.

Many inherent benefits of this invention can now be appreciated. For example, the permanent connection between the cold water supply line and the base inlet eliminates the possibility of accidentally introducing hot water into the cartridge, which could happen when the inlet water to the cartridge is off a sink faucet outlet having separate hot and cold water controls. Also, the valve connection upstream of the cartridge provides that the cartridge is not subjected to any water line pressure when the valve is closed, as the cartridge outlet at spigot 10 is open to the atmosphere.

What is claimed is:

1. A countertop water treatment unit comprising a vertically oriented water treatment cartridge (20), filtrated water outlet means (10), and a base (30) having a means for receiving an inlet end of said water treatment cartridge; said base (30) includes a combined means (40) extended downward for fastening said base to a sink surface and for receiving water from a potable cold water supply line, said base (30) further includes a valve (50) for controlling water flow through said base (30) and said water treatment cartridge, and said combined means (40) extended downward from said base includes fastening threads (41) with a corresponding nut (65).

2. A countertop water treatment unit comprising the combination of a base (30) adapted to be permanently mounted on a countertop (100), a vertically oriented water treatment cartridge (20) removably mounted on the base, and a filtrated water outlet means (10); said base having an intermediate surface and a combined means (40) extended downward beyond the intermediate surface in the direction away from the cartridge and operatively fitted through a countertop opening to have said intermediate surface proximate the countertop upper side, and a nut (65) cooperating with an intermediate threaded portion (41) of the combined means for tightening the base intermediate surface against the countertop upper side; said combined means having a lower portion suited for cooperating with connection means for establishing a water-tight connection with a water supply conduit, said base and combined means having a through passage (42) between the water supply conduit and the cartridge inlet end as mounted on the base; and a valve (50) supported in the base with a part located in a series connection with the through passage operable in an open position for admitting water flow from the supply conduit to the cartridge and in a closed position for blocking said flow, (thereby) allowing the cartridge removal from the base while the water supply conduit remains pressurized, and the valve having an external part (51, 52) suited for manual valve actuation between the opened and closed positions.

3. A countertop water treatment unit according to claim 2, further comprising a resilient annular seal (60) surrounding the hollow combined means and interposed between the base intermediate surface and the countertop upper side.

4. A countertop water treatment unit according to claim 2, with said base (30) and said hollow combined means (40) constituting a monolithic structure.

5. A countertop water treatment unit according to claim 2, with said base including an exterior opening (31) from the cartridge inlet end as mounted on the base, and a closure plug (70) for the base opening operable when removed therefrom for draining the cartridge.

6. A countertop water treatment unit according to claim 2, wherein said water treatment cartridge is tubular comprising stub pipes on both ends, with the inlet end stub pipe (27) having a larger diameter than the outlet end stub pipe (28).

7. A countertop water treatment unit according to claim 2, with said water treatment cartridge ends comprising fastening threads (27, 28).

8. A countertop water treatment unit according to claim 2, wherein said valve constitutes a slide member (50) shifted between valve opened and valve closed positions, the valve member having an asymmetrical opening (56) effective in the valve opened position to define part of the through passage for admitting water flow to the cartridge, and the valve member also having seals effective in the valve closed position to close the through passage and block water flow to the cartridge.

9. A countertop water treatment unit according to claim 2, wherein said unit further comprises a decorative cover (90) surrounding said water treatment cartridge.

10. A countertop water treatment unit according to claim 2, wherein said unit comprises a hollowed water treatment cartridge (20) and a housing (91), wherein said housing encloses said hollowed water treatment cartridge.

* * * * *